(12) United States Patent
Kim et al.

(10) Patent No.: US 7,508,464 B2
(45) Date of Patent: Mar. 24, 2009

(54) ARRAY SUBSTRATE, MANUFACTURING METHOD OF THE SAME, AND FABRICATING METHOD OF LIQUID CRYSTAL DISPLAY DEVICE INCLUDING THE ARRAY SUBSTRATE

(75) Inventors: Jeom-Jae Kim, Seoul (KR); Moo-Hyoung Song, Daegu (KR); Chang-Bae Park, Daegu (KR); Jung-Eun Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 628 days.

(21) Appl. No.: 11/312,351

(22) Filed: Dec. 21, 2005

(65) Prior Publication Data
US 2007/0002204 A1 Jan. 4, 2007

(30) Foreign Application Priority Data
Jun. 30, 2005 (KR) .................. 10-2005-0057484

(51) Int. Cl.
*G02F 1/1333* (2006.01)
(52) U.S. Cl. .................. 349/54; 349/158; 349/40
(58) Field of Classification Search .............. 349/54, 349/158, 40, 84, 139
See application file for complete search history.

(56) References Cited

U.S. PATENT DOCUMENTS

| | | | | |
|---|---|---|---|---|
| 5,459,410 A | * | 10/1995 | Henley | 324/770 |
| 6,587,160 B2 | * | 7/2003 | Lee et al. | 349/40 |
| 6,734,925 B1 | * | 5/2004 | Lee et al. | 349/40 |
| 7,388,626 B2 | * | 6/2008 | Wu et al. | 349/54 |
| 2007/0046336 A1 | * | 3/2007 | Kang et al. | 326/101 |

* cited by examiner

*Primary Examiner*—Mike Qi
(74) *Attorney, Agent, or Firm*—McKenna Long & Aldridge LLP

(57) ABSTRACT

A manufacturing method of an array substrate for a liquid crystal display device includes among other features, preparing a substrate including a display area and a non-display area, forming first and second gate shorting bars in the non-display area and electrically connected to gate lines, forming first and second data shorting bars in the non-display area and electrically connected to data lines, forming n gate probe test lines in the non-display area, forming m data probe test lines in the non-display area, forming first connection patterns connecting the gate lines and the n gate probe test lines, and forming second connection patterns connecting the data lines and the m data probe test lines, wherein the gate lines include n gate groups connected to the n gate probe test lines, respectively, and wherein the data lines include m data groups connected to the m data probe test lines, respectively.

25 Claims, 6 Drawing Sheets

US 7,508,464 B2

ARRAY SUBSTRATE, MANUFACTURING METHOD OF THE SAME, AND FABRICATING METHOD OF LIQUID CRYSTAL DISPLAY DEVICE INCLUDING THE ARRAY SUBSTRATE

The present invention claims the benefit of Korean Patent Application No. 2005-0057484 filed on Jun. 30, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an array substrate, a manufacturing method of the same and a fabricating method of a liquid crystal display device including the array substrate.

2. Discussion of the Related Art

Liquid crystal display (LCD) devices use the optical anisotropy and polarization properties of liquid crystal molecules to produce an image. Liquid crystal molecules have a definite alignment as a result of their long, thin shapes and are arranged to have initial pretilt angles. The alignment direction can be controlled by applying an electric field. Specifically, variations in an applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

A manufacturing process of the LCD devices includes a thin film transistor array process for forming a lower substrate, an upper substrate forming process, and a liquid crystal cell process. During the thin film transistor array process, a plurality of gate and data lines are formed on a substrate, and plurality of thin film transistors are formed at crossing portions of the gate and data lines. Then, a pixel electrode is formed in a pixel region of the lower substrate. During the upper substrate forming process, a color filter, a black matrix, and a common electrode are sequentially formed on a substrate. The liquid crystal cell process includes an alignment layer forming process, a rubbing process, a cleaning process subsequent to the rubbing process, an attachment process of the upper and lower substrates, and a liquid crystal material injection process. The aforementioned liquid crystal cell process will be described in greater detail hereinafter with reference to attached drawings.

FIG. 1 shows a flow chart of a manufacturing process of an LCD device according to the related art.

Step ST1 includes the preparation of a first substrate, which has a thin film transistor and a pixel electrode, and a second substrate, which has a black matrix, a color filter layer and a common electrode.

Step ST2 includes the tests of the first and second substrates. Gate and data lines are inspected through testing of the first substrate. The test of the first substrate may be referred to as an in-process test multi-pattern search (IPT-MPS). Test signals are provided to the gate and data lines through shorting bars that are formed on the first substrate. The shorting bars also prevent static electricity on the first substrate during the thin film transistor array process. Fine patterns of the color filter layer are inspected through testing of the second substrate.

Step ST3 includes the formation of first and second alignment layers on the pixel electrode and the common electrode, respectively. Step ST3 also includes coating a thin polymer film and rubbing the thin polymer film. The thin polymer film may be commonly referred to as an alignment layer. The thin polymer film must be uniformly formed, and the rubbing process must also be performed uniformly on the thin polymer film. The initial orientation of liquid crystal molecules is determined by the rubbing. The liquid crystal molecules normally display a uniform picture due to the rubbing of the alignment layer. Polyimide is widely used as a material of the thin polymer film.

During step ST4, a seal pattern is formed on either the first substrate or the second substrate, and spacers are sprayed on one of the first and second substrates to maintain a precise and uniform gap between the first and second substrates. The formation of the seal pattern includes forming a cell gap to allow for injection of liquid crystal material between the substrates. In addition, the seal pattern prevents the injected liquid crystal material from leaking outside the seal pattern. The seal pattern is commonly fabricated using a screen-printing method or a dispensing method of a mixing sealant formed from thermosetting resin and glass fiber. The spacer spray method can be divided into two different types: a wet spray method that involves spraying a mixture of alcohol and spacer material and a dry spray method that involves spraying spacer material alone.

Here, the seal pattern and the spacers are formed on different substrates. For example, the seal pattern may be formed on the second substrate, which has a relatively even surface, and the spacers may be formed on the first substrate, which functions as a lower substrate of the liquid crystal display device.

During step ST5, the first and second substrates are aligned and then are attached to each other along the seal pattern. The alignment accuracy of the substrates is decided by a margin and an alignment accuracy of several micrometers is required because light leakage occurs if the substrates are misaligned beyond the margin.

During step ST6, the attached substrates are divided into unit cells. The cell cutting process includes a scribing process that forms cutting lines on a surface of the substrate using a diamond pen or a cutting wheel of tungsten carbide, the hardness of which is higher than the hardness of the glass substrate. A breaking process divides the unit cells by using force. In this step, the shorting bars may be removed.

During step ST7, a liquid crystal material is injected between two substrates of the unit cells. Each unit cell has an area of several square centimeters and a gap of several micrometers. A vacuum injection method using the pressure difference between the inside and outside of the unit cells is commonly used as an effective injection method.

After finishing the liquid crystal material injection, the injection hole is sealed to prevent leakage of the liquid crystal material. Generally, an ultra violet (UV) curable resin is injected into the injection hole by use of a dispenser, and ultra violet light is then irradiated onto the resin to thereby harden the resin and seal the injection hole.

Alternatively, the liquid crystal material may be dropped on one of the first and second substrates and then the first and second substrates may be attached.

During step ST8, each unit cell is inspected through an autoprobe test. Line defects and point defects are detected through the autoprobe test. Signals are provided to gate pads and data pads on the first substrate, and an LC panel is practically driven.

FIG. 2 is a schematic plan view of an array substrate for an LCD device according to the related art.

In FIG. 2, an active area AA and a pad area PA are defined on a substrate 1. Gate lines GL and data lines DL are formed in the active area AA, and gate pads GP and data pads DP are formed in the pad area PA. First, second, third and fourth shorting bars 2, 4, 6 and 8 are also formed in the pad area PA. The first and second shorting bars 2 and 4 are connected to the gate pads GP, and the third and fourth shorting bars 6 and 8 are connected to the data pads DP. The first shorting bar 2 is connected to even gate lines GL through the gate pads GP, and the second shorting bar 4 is connected to odd gate lines GL through the gate pads GP. The third shorting bar 6 is odd data lines DL through the data pads DP, and the fourth shorting bar 8 is even data lines DL through the data pads DP.

The first, second, third and fourth shorting bars 2, 4, 6 and 8 are used to test the array substrate at the step ST2 of FIG. 1 and are cut at the step ST6 of FIG. 1. Then, the autoprobe test is performed. To apply the signals to the gate pads GP and the data pads DP, a needle frame is used, and thus line defects, point defects or contamination spots are detected.

FIG. 3 is a view schematically illustrating a needle frame according to the related art.

In FIG. 3, the needle frame 25 includes a body 28 and contact portions 30. The contact portions 30 have a pin shape and are formed of a conductive metallic material such as nickel (Ni). The contact portions 30 contact the gate pads GP and the data pads DP of FIG. 2 and provide test signals to the gate pads GP and the data pads DP.

However, because the contact portions 30 correspond to respective gate pads GP and respective data pads DP, the number of the contact portions 30 should increase according as the resolution of an LCD device becomes high. Therefore, manufacturing costs are increased.

Additionally, positions or distances of the gate pads GP and the data pads are varied according to the resolutions of the LCD device. Thus, various needle frames are required, and needle frames are changed according to the resolutions of the LCD device to thereby lower the productivity.

SUMMARY OF THE INVENTION

Accordingly, the present invention is directed to an array substrate, a manufacturing method of the same and a fabricating method of a liquid crystal display device including the array substrate that substantially obviates one or more problems due to limitations and disadvantages of the related art.

An advantage of the present invention is to provide an array substrate and a manufacturing method of the same that improve a test process and reduce manufacturing costs.

Another advantage of the present invention is to provide a fabricating method of a liquid crystal display device having improved productivity.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of an array substrate for a liquid crystal display device includes preparing a substrate including a display area and a non-display area, forming gate and data lines in the display area on the substrate, wherein the gate and data lines cross each other to define a pixel region, forming a thin film transistor at each crossing of the gate and data lines, forming a pixel electrode to the thin film transistor in the pixel region, forming first and second gate shorting bars in the non-display area and electrically connected to the gate lines, forming first and second data shorting bars in the non-display area and electrically connected to the data lines, forming n gate probe test lines (where n is an integer) in the non-display area, forming m data probe test lines (where m is an integer) in the non-display area, forming first connection patterns connecting the gate lines and the n gate probe test lines, and forming second connection patterns connecting the data lines and the m data probe test lines, wherein the gate lines include n gate groups connected to the n gate probe test lines, respectively, and wherein the data lines include m data groups connected to the m data probe test lines, respectively.

In another aspect of the present invention, an array substrate for a liquid crystal display device includes a substrate including a display area and a non-display area, gate and data lines in the display area on the substrate, wherein the gate and data lines cross each other to define a pixel region, a thin film transistor at each crossing of the gate and data lines, a pixel electrode connected to the thin film transistor in the pixel region, first and second gate shorting bars in the non-display area and electrically connected to the gate lines, first and second data shorting bars in the non-display area and electrically connected to the data lines, n gate probe test lines (where n is an integer) in the non-display area, m data probe test lines (where m is an integer) in the non-display area, first connection patterns connecting the gate lines and the n gate probe test lines, and second connection patterns connecting the data lines and the m data probe test lines, wherein the gate lines include n gate groups connected to the n gate probe test lines, respectively, and wherein the data lines include m data groups connected to the m data probe test lines.

In a further aspect of the present invention, a fabricating method of a liquid crystal display device includes forming an array substrate including gate and data shorting bars and gate and data probe test lines, forming a color filter substrate, inspecting the array substrate by applying signals to the gate and data shorting bars, attaching the tested array substrate and the color filter substrate to each other with a liquid crystal layer therebetween to form a liquid crystal cell, and inspecting the liquid crystal cell by applying signals to the gate and data probe test lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
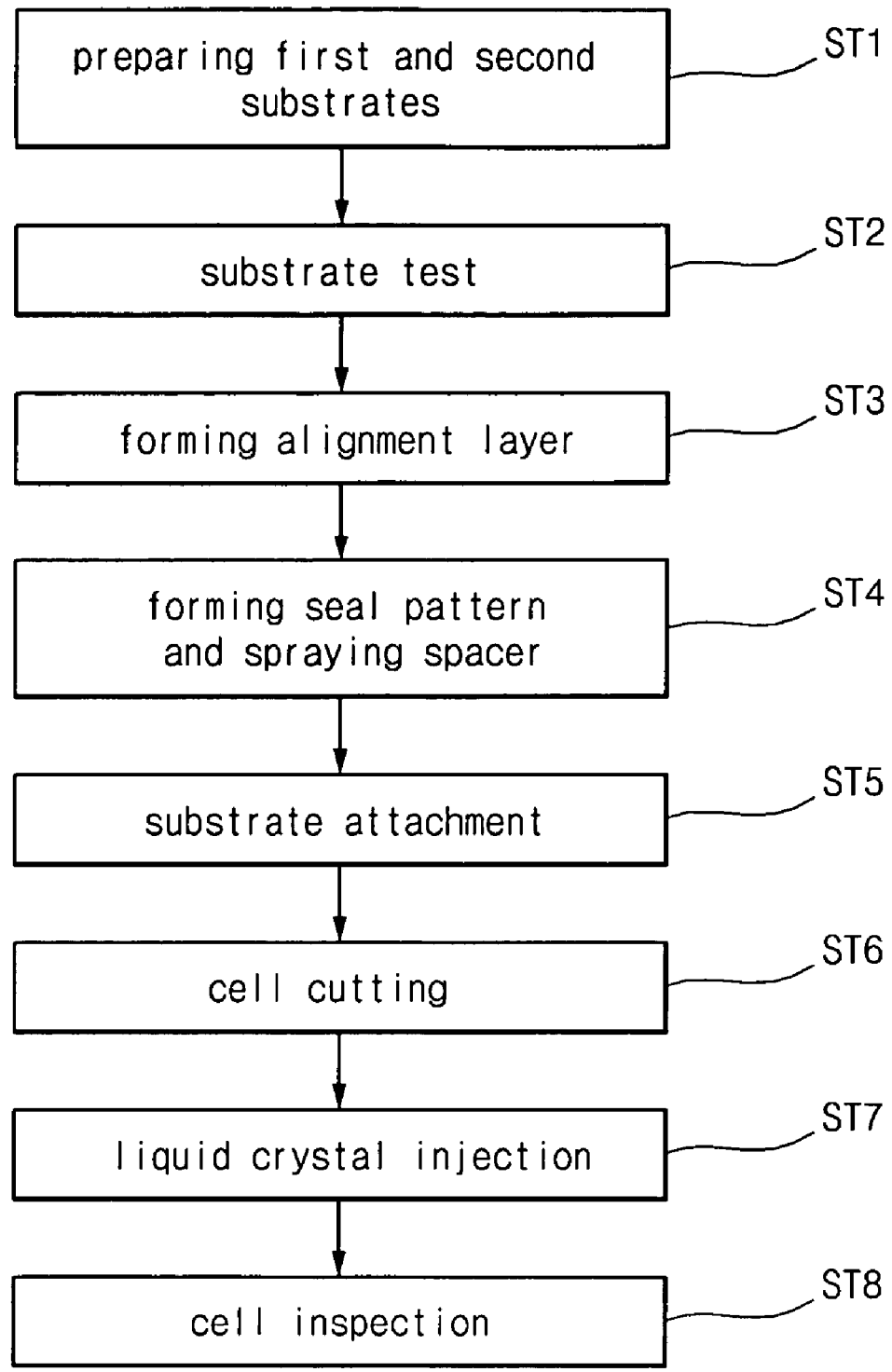
FIG. 1 is a flow chart of a manufacturing process of an LCD device according to the related art.
Figure 2:
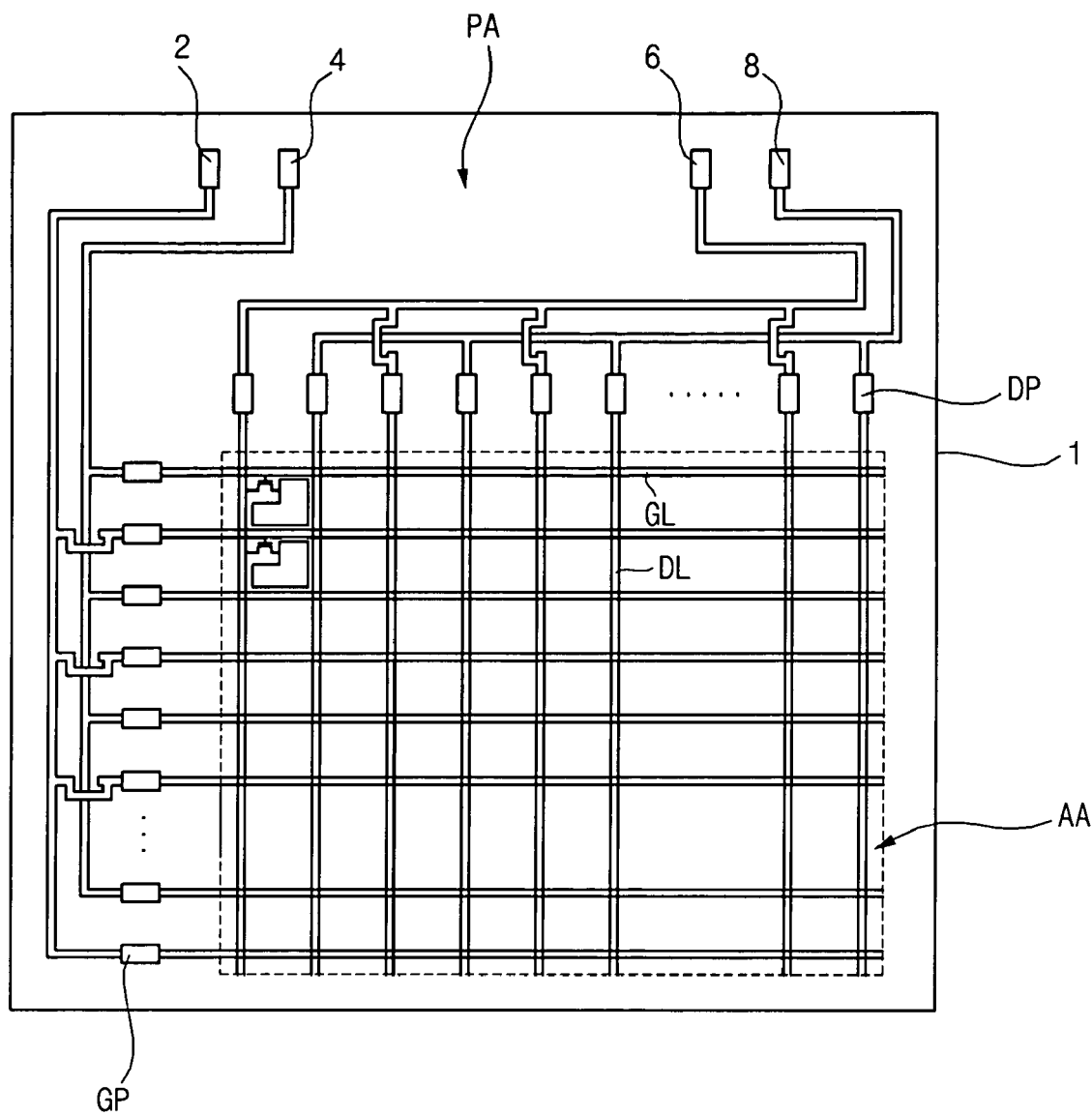
FIG. 2 is a schematic plan view of an array substrate for an LCD device according to the related art.
Figure 3:
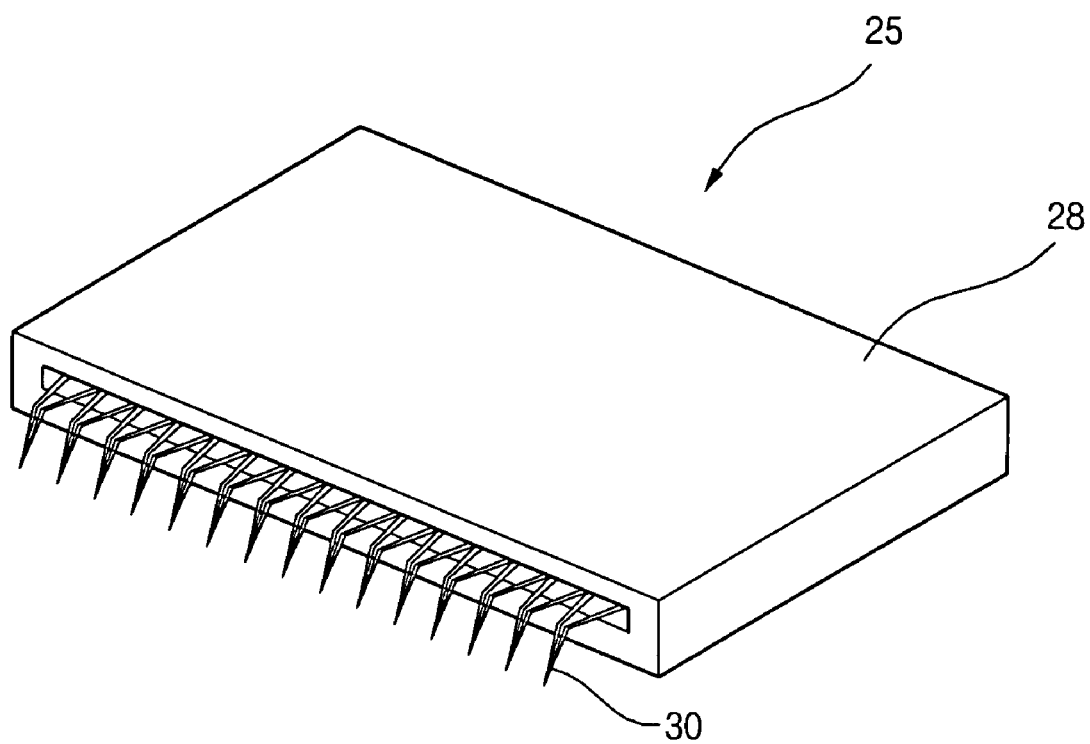
FIG. 3 is a view schematically illustrating a needle frame according to the related art.
Figure 4:
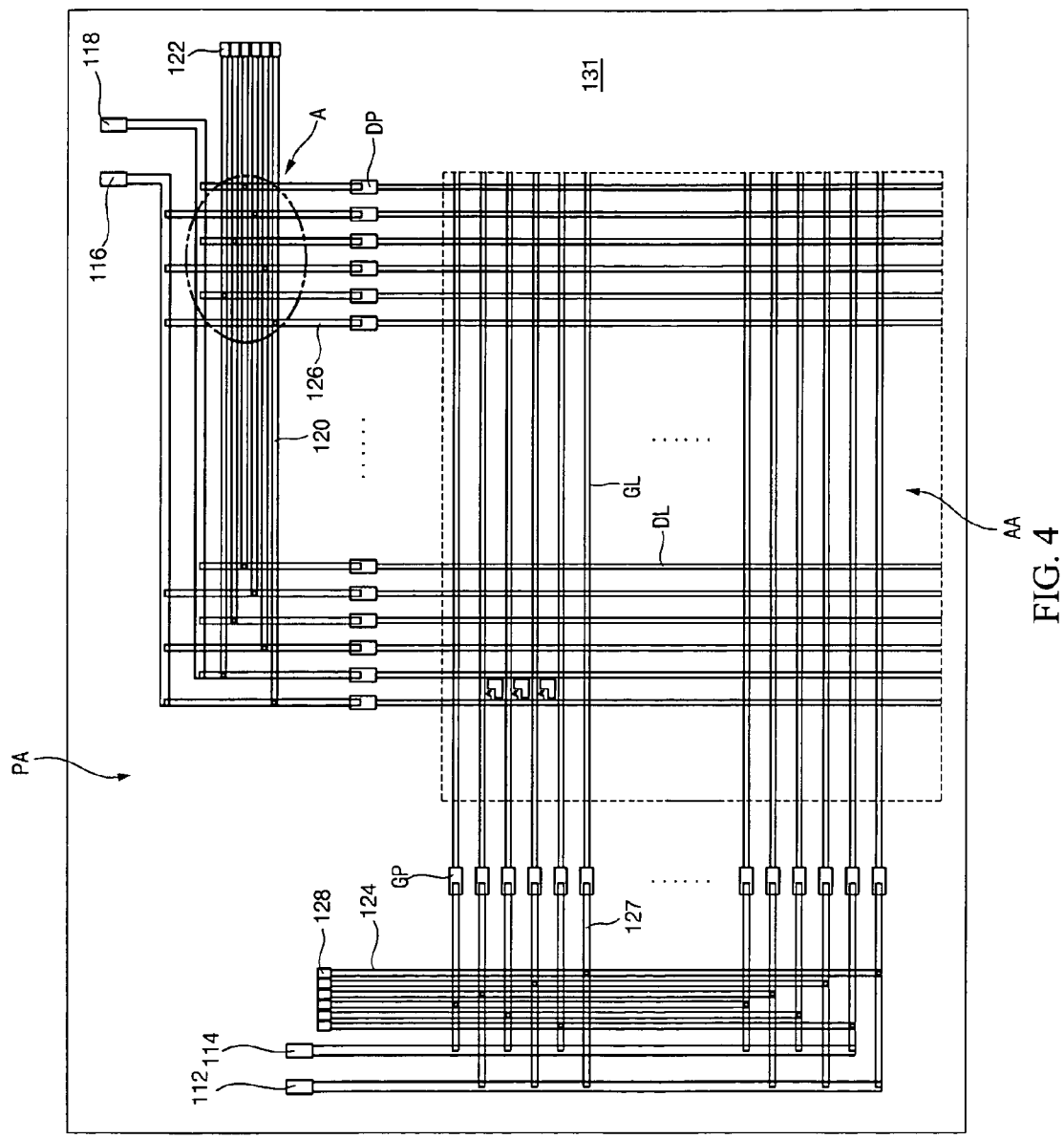
FIG. 4 is a plan view illustrating an array substrate according to the present invention.

FIG. 4 is a plan view illustrating an array substrate according to the present invention.

In FIG. 4, a display area AA, which may be referred to as an active area, and a non-display area PA, which may be referred to as a pad area, are defined on a substrate 131. Gate lines GL and data lines DL are formed in the display area AA and cross each other to define pixel regions. A thin film transistor and a pixel electrode connected to the thin film transistor are formed in each pixel region. Gate pads GP are formed at one ends of the gate lines GL and are disposed in the non-display area PA. Data pads DP are formed at one end of the data lines DL and are disposed in the non-display area PA.

To prevent static electricity, first and second gate shorting bars 112 and 114 and first and second data shorting bars 116 and 118 are formed in the non-display area PA. The first and second gate shorting bars 112 and 114 are electrically connected to the gate pads GP, and the first and second data shorting bars 116 and 118 are electrically connected to the data pads DP. The shorting bars 112, 114, 116 and 118 are grounded and block the static electricity transmitted to the gate lines GL and the data lines DL to thereby protect the thin film transistors from the static electricity.

Gate probe test lines 124 and data probe test lines 120 are formed in the non-display area PA. Gate probe test pads 128 are formed at one end of the gate probe test lines 124, and data probe test pads 122 are formed at one end of the data probe test lines 120. The gate probe test lines 124 are substantially parallel with the first and second gate shorting bars 112 and 114 and substantially perpendicular to the gate lines GL. The gate probe test lines 124 are disposed between the gate shorting bars 112 and 114 and the gate lines GL. The data probe test lines 120 are substantially parallel to the first and second data shorting bars 116 and 118 and perpendicular to the data lines DL. The data probe test lines 120 are disposed between the data shorting bars 116 and 118 and the data lines DL.

First connection patterns 127 connect the gate pads GP with the gate probe test lines 124 and the gate shorting bars 112 and 114. Second connection patterns 126 connect the data probe test lines 120 and the data shorting bars 116 and 118. The first and second connection patterns 127 and 126 may be formed of the same material and in the same layer as the pixel electrode. The first and second connection patterns 127 and 126 may be formed of a transparent conductive material such as indium zinc oxide (IZO) and indium tin oxide (ITO).

The first gate shorting bar 112 is electrically connected to even gate lines GL through the gate pads GP and the first connection patterns 127, and the second gate shorting bar 114 is electrically connected to odd gate lines GL through the gate pads GP and the first connection patterns 127. The first data shorting bar 116 is electrically connected to odd data lines DL through the data pads DP and the second connection patterns 126, and the second data shorting bar 118 is electrically connected to even data lines DL through the data pads DP and the second connection patterns 126.

Here, the number of the gate probe test lines 124 is six, and the number of the data probe test lines 120 is six. The gate lines GL are divided into six gate groups connected to respective gate probe test lines 124. The data lines DL are divided into six data groups connected to respective data probe test lines 120. Adjacent gate lines GL are connected to different gate probe test lines 124, and beneficially, the gate lines GL are sequentially connected to the six gate probe test lines 124. In addition, adjacent data lines DL are also connected to different data probe test lines 120, and beneficially, the data lines DL are sequentially connected to the six data probe test lines 120.

The number of the gate probe test lines 124 and the data probe test lines 120 can be changed. The number of the gate probe test lines 124 and the data probe test lines 120 may be more than two, and the number of the data probe test lines 120, desirably, may be more than three.

Meanwhile, the gate shorting bars 112 and 114, the gate probe test lines 124, the data shorting bars 116 and 118, and the data probe test lines 120 are formed of the same material and in the same layer as either the gate lines GL or the data lines DL. When the gate shorting bars 112 and 114, the gate probe test lines 124, the data shorting bars 116 and 118, and the data probe test lines 120 are formed of the same material and in the same layer as the gate lines GL, the first and second connection patterns 127 and 126 may be formed of the same material and in the same layer as either the data lines DL or the pixel electrodes. When the gate shorting bars 112 and 114, the gate probe test lines 124, the data shorting bars 116 and 118, and the data probe test lines 120 are formed of the same material and in the same layer as the data lines DL, the first and second connection patterns 127 and 126 may be formed of the same material and in the same layer as the pixel electrodes.

The array substrate goes through the cell process as stated in the related art. Accordingly, the array substrate is inspected by applying signals to the first and second gate shorting bars 112 and 114 and the first and second data shorting bars 116 and 118. Then, alignment layers are formed on the array substrate and a color filter substrate, respectively. A seal pattern is formed on one of the array substrate and the color filter substrate, and spacers are sprayed on the other of the array substrate and the color filter substrate. Next, the array substrate and the color filter substrate are aligned and attached using the seal pattern. A liquid crystal material is injected between the attached substrates, and the attached substrates are divided into unit cells. At this time, the shorting bars 112, 114, 116 and 118 may be removed. Next, the unit cell is inspected by applying test signals to the gate and data probe test pads 128 and 122. Alternatively, the liquid crystal material may be disposed on one of the substrates, and then the substrate may be attached.

Figure 5:
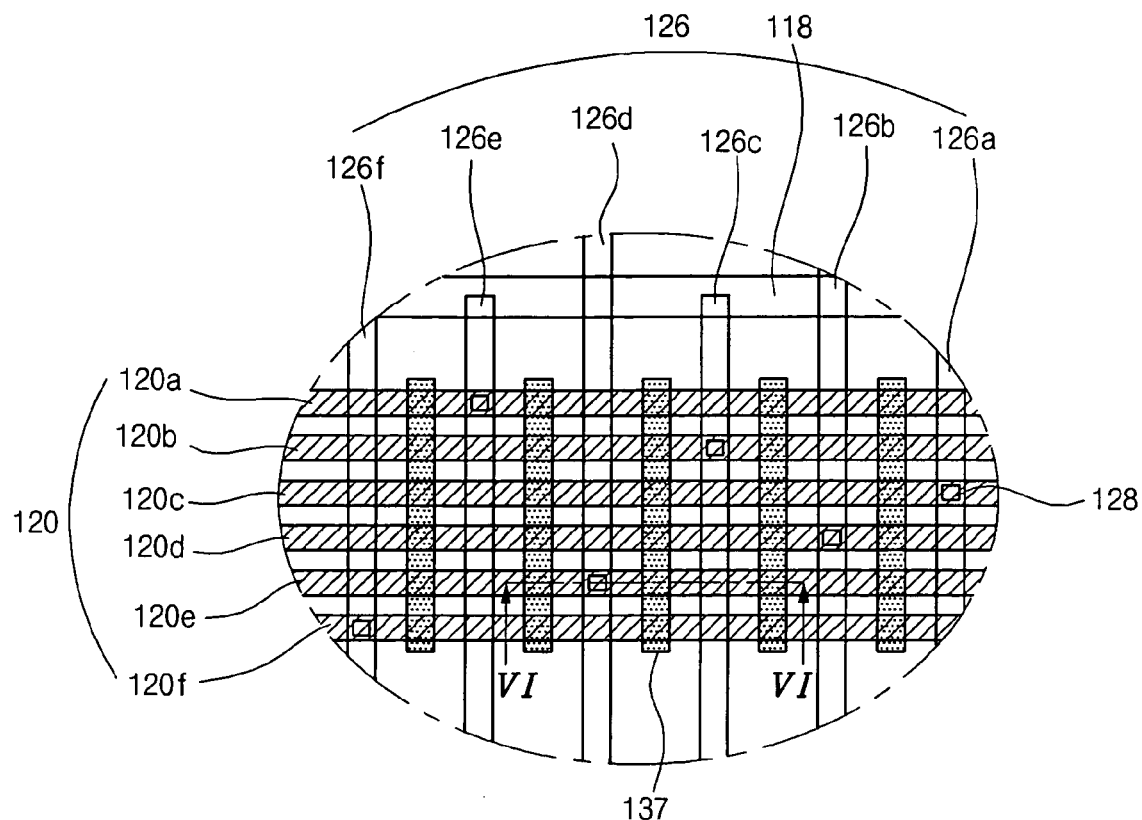
FIG. 5 is an enlarged view of a portion A of FIG. 4.

Meanwhile, a pattern or a hole may be formed between adjacent connection patterns. FIG. 5 is an enlarged view of a portion A of FIG. 4.

In FIG. 5, data probe test lines 120 are formed between a data shorting bar 118 and data lines (not shown). Connection patterns 126 are formed across the data probe test lines 120. The connection patterns 126 are connected to respective data pads (not shown), which are formed at one end of the data lines. Each connection pattern 126 is connected to one of the data probe test lines 120 through a contact hole 128.

More particularly, the first connection pattern 126a is connected to the third data probe test line 120c, the second connection pattern 126b is connected to the fourth data probe test line 120d, the third connection pattern 126c is connected to the second data probe test line 120b, the fourth connection pattern 126d is connected to the fifth data probe test line 120e, the fifth connection pattern 126e is connected to the first data probe test line 120a, and the sixth connection pattern 126f is connected to the sixth data probe test line 120f.

The connection patterns 126 may be sequentially connected to the data probe test lines 120 in the above order. Accordingly, the adjacent connection patterns 126 are connected to the different data probe test lines 120, respectively.

As stated above, the data probe test lines 120 may be formed of the same material and in the same layer as the gate lines GL of FIG. 4, and the connection patterns 126 may be formed of the same material and in the same layer as the pixel electrodes. The contact holes 128 are formed at the crossing portions of the data probe test lines 120 and the connection patterns 126 and expose the data probe test lines 120, respectively.

Although not shown in the figure, the connection patterns 126 are also connected to the data pads through contact holes.

Here, odd signals may be applied to the first, second and third data probe test lines 120a, 120b and 120c, and even signals may be applied to the fourth, fifth and sixth data probe test lines 120d, 120e and 120f. Accordingly, the line defects, the point defects or the contamination spots can be detected.

However, since a distance between the adjacent data pads DP is narrow, a distance between the adjacent connection patterns 126 is also narrow. Therefore, the adjacent connection patterns 126 may easily electrically short. To prevent an electrical short between the adjacent connection patterns 126, an amorphous silicon pattern 137 is formed under and between the adjacent connection patterns 126.

Figure 6A:
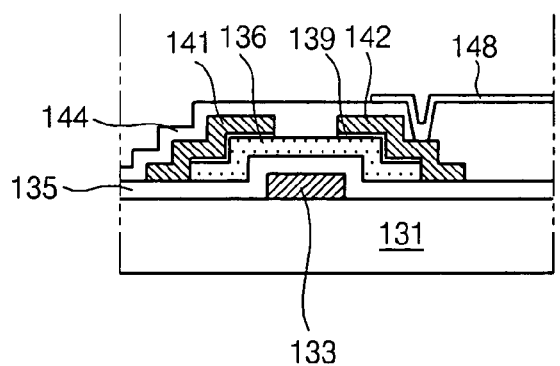
FIGS. 6A and 6B are cross-sectional views of an array substrate according to an embodiment of the present invention.
Figure 6B:
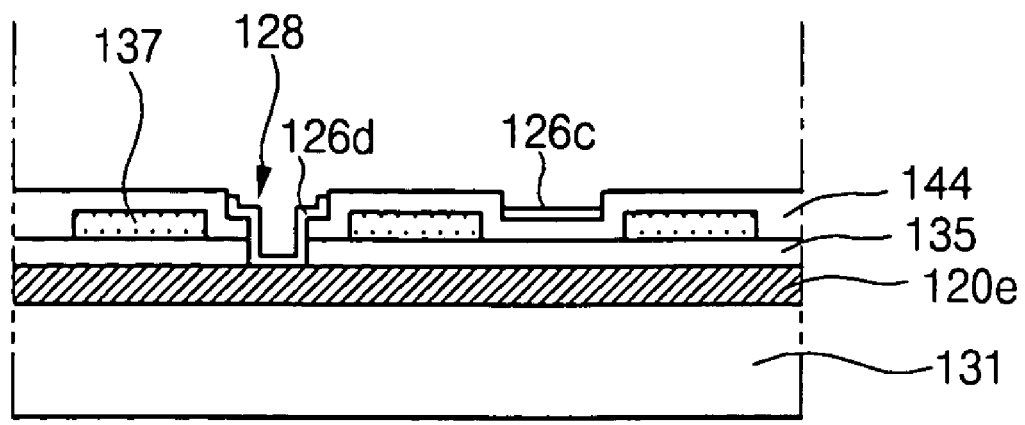

FIGS. 6A and 6B are cross-sectional views of an array substrate according to an embodiment of the present invention. FIG. 6A shows a pixel region, and FIG. 6B illustrates a cross-section along the line VI-VI of FIG. 5.

In FIG. 6A, a gate electrode 133 is formed on a substrate 131, and a gate insulating layer 135 is formed on the gate electrode 133. An active layer 136 is formed on the gate insulating layer 135 over the gate electrode 133, and an ohmic contact layer 139 is formed on the active layer 136. Source and drain electrodes 141 and 142 are formed on the ohmic contact layer 139. A passivation layer 144 is formed on the source and drain electrodes 141 and 142 and has a drain contact hole exposing a part of the drain electrode 142. A pixel electrode 148 is formed on the passivation layer 144 and is connected to the exposed part of the drain electrode 142 through the drain contact hole.

In FIG. 6B, the fifth data probe test line 120e of the same material as the gate electrode 133 is formed on the substrate 131, and the gate insulating layer 135 covers the data probe test line 120. The gate insulating layer 135 may be formed of an inorganic material such as silicon nitride ($SiN_x$) or silicon oxide ($SiO_2$). The amorphous silicon patterns 137 of the same material as the active layer 136 are formed on the gate insulating layer 135. The passivation layer 144 covers the amorphous silicon patterns 137 and has the contact hole 128 exposing the fifth data probe test line 120e with the gate insulating layer 135. The third and fourth connection patterns 126c and 126d of the same material as the pixel electrode 148 are formed on the passivation layer 144. The fourth connection patterns 126d is connected to the fifth data probe test line 120e through the contact hole 128.

Here, each amorphous silicon pattern 127 is disposed between the adjacent connection patterns, and thus the amorphous silicon pattern 127 is disposed between the third and fourth connection patterns 126c and 126d. Accordingly, the adjacent third and fourth connection patterns 126c and 126d do not short each other due to a step of the amorphous silicon pattern 137.

Figure 7:
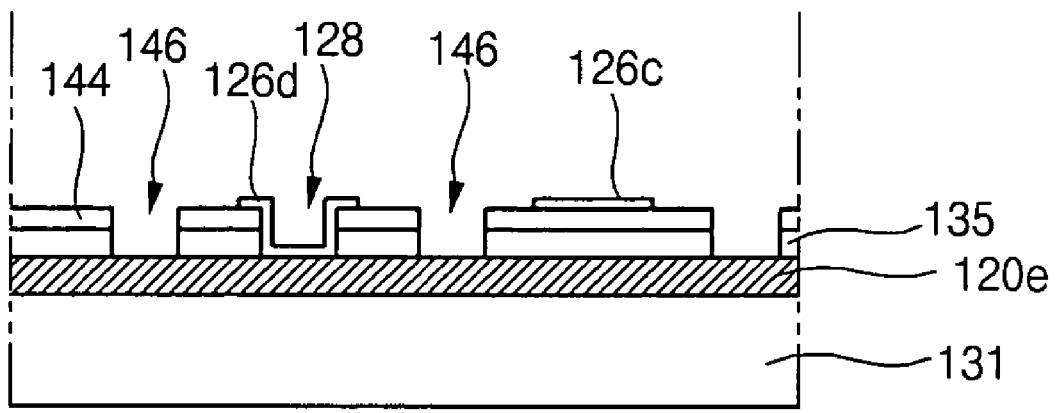
FIG. 7 is a cross-sectional view of an array substrate according to another embodiment of the present invention.

FIG. 7 is a cross-sectional view of an array substrate according to another embodiment of the present invention and illustrates a cross-section along the line VI-VI of FIG. 5.

In FIG. 7, the fifth data probe test line 120e of the same material as the gate electrode 133 is formed on the substrate 131, and the gate insulating layer 135 covers the data probe test line 120. The passivation layer 144 is formed on the gate insulating layer 135. The passivation layer 144 has the contact hole 128 exposing the fifth data probe test line 120e with the gate insulating layer 135. Holes 146 are also formed in the passivation layer 144 and the gate insulating layer 135. The holes 146 exposes the fifth data probe test line 120e. The third and fourth connection patterns 126c and 126d of the same material as the pixel electrode 148 are formed on the passivation layer 144. The fourth connection patterns 126d is connected to the fifth data probe test line 120e through the contact hole 128.

Here, each hole 146 is disposed between the adjacent connection patterns, and thus the hole 146 is disposed between the third and fourth connection patterns 126c and 126d. Accordingly, the adjacent third and fourth connection patterns 126c and 126d do not short each other due to the hole 146.

Meanwhile, an amorphous silicon pattern or a hole is formed under and between the adjacent connection patterns that are connected to the gate probe test lines.

In the present invention, by using the gate and data probe test lines, a liquid crystal cell may be easily inspected regardless of the number of gate lines and data lines. Therefore, the manufacturing costs are decreased as compared to the related art, and the productivity is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of an array substrate for a liquid crystal display device, comprising:
   preparing a substrate including a display area and a non-display area;
   forming gate and data lines in the display area on the substrate, wherein the gate and data lines cross each other to define a pixel region;
   forming a thin film transistor at each crossing of the gate and data lines;
   forming a pixel electrode connected to the thin film transistor in the pixel region;
   forming first and second gate shorting bars in the non-display area and electrically connected to the gate lines;
   forming first and second data shorting bars in the non-display area and electrically connected to the data lines;
   forming n gate probe test lines (where n is an integer) in the non-display area;
   forming m data probe test lines (where m is an integer) in the non-display area;
   forming first connection patterns connecting the gate lines and the n gate probe test lines; and
   forming second connection patterns connecting the data lines and the m data probe test lines,
   wherein the gate lines include n gate groups connected to the n gate probe test lines, respectively, and
   wherein the data lines include m data groups connected to the m data probe test lines, respectively.

2. The method according to claim 1, further comprising forming a first pattern under and between adjacent first connection patterns and a second pattern under and between adjacent second connection patterns.

3. The method according to claim 2, wherein adjacent gate lines are connected to different gate probe test lines, respectively, and adjacent data lines are connected to different data probe test lines, respectively.

4. The method according to claim 2, wherein the first and second patterns are formed of a same material and in a same layer as an active layer of the thin film transistor.

5. The method according to claim 2, wherein the n gate probe test lines and the m data probe test lines are formed of a same material and in a same layer as the gate lines, and the first connection patterns and the second connection patterns are formed of a same material and in a same layer as the pixel electrode.

6. The method according to claim 1, further comprising forming an insulating layer between the m gate probe test lines and the first connection patterns and between the m data probe test lines and the second connection patterns, wherein the insulating layer includes a first hole between adjacent first connection patterns, and a second hole between adjacent second connection patterns.

7. The method according to claim 6, wherein adjacent gate lines are connected to different gate probe test lines, respectively, and adjacent data lines are connected to different data probe test lines, respectively.

8. The method according to claim 6, wherein the insulating layer covers the thin film transistor.

9. The method according to claim 6, wherein the n gate probe test lines and the m data probe test lines are formed of a same material and in a same layer as the gate lines, and the first connection patterns and the second connection patterns are formed of a same material and in a same layer as the pixel electrode.

10. An array substrate for a liquid crystal display device, comprising:
a substrate including a display area and a non-display area;
gate and data lines in the display area on the substrate, wherein the gate and data lines cross each other to define a pixel region;
a thin film transistor at each crossing of the gate and data lines;
a pixel electrode connected to the thin film transistor in the pixel region;
first and second gate shorting bars in the non-display area and electrically connected to the gate lines;
first and second data shorting bars in the non-display area and electrically connected to the data lines;
n gate probe test lines (where n is an integer) in the non-display area;
m data probe test lines (where m is an integer) in the non-display area;
first connection patterns connecting the gate lines and the n gate probe test lines; and
second connection patterns connecting the data lines and the m data probe test lines,
wherein the gate lines include n gate groups connected to the n gate probe test lines, respectively, and
wherein the data lines include m data groups connected to the m data probe test lines, respectively.

11. The array substrate according to claim 10, further comprising a first pattern under and between adjacent first connection patterns, and a second pattern under and between adjacent second connection patterns.

12. The array substrate according to claim 11, wherein adjacent gate lines are connected to different gate probe test lines, respectively, and adjacent data lines are connected to different data probe test lines, respectively.

13. The array substrate according to claim 11, wherein the first and second patterns are formed of intrinsic amorphous silicon.

14. The array substrate according to claim 11, wherein the n gate probe test lines and the m data probe test lines are formed of a same material and in a same layer as the gate lines, and the first connection patterns and the second connection patterns are formed of a same material and in a same layer as the pixel electrode.

15. The array substrate according to claim 10, further comprising an insulating layer between the n gate probe test lines and the first connection patterns and between the m data probe test lines and the second connection patterns, wherein the insulating layer includes a first hole between adjacent first connection patterns, and a second hole between adjacent second connection patterns.

16. The array substrate according to claim 15, wherein adjacent gate lines are connected to different gate probe test lines, respectively, and adjacent data lines are connected to different data probe test lines, respectively.

17. The array substrate according to claim 15, wherein the insulating layer covers the thin film transistor.

18. The array substrate according to claim 15, wherein the n gate probe test lines and the m data probe test lines are formed of a same material and in a same layer as the gate lines, and the first connection patterns and the second connection patterns are formed of a same material and in a same layer as the pixel electrode.

19. The array substrate according to claim 10, wherein n is more than two and m is more three.

20. A fabricating method of a liquid crystal display device, comprising:
forming an array substrate including gate and data shorting bars and gate and data probe test lines;
forming a color filter substrate;
inspecting the array substrate by applying signals to the gate and data shorting bars;
attaching the tested array substrate and the color filter substrate to each other with a liquid crystal layer therebetween to form a liquid crystal cell; and
inspecting the liquid crystal cell by applying signals to the gate and data probe test lines.

21. The method according to claim 20, further comprising cutting the attached substrates into unit cells, wherein each unit cell forms the liquid crystal cell.

22. The method according to claim 21, wherein cutting the attached substrates includes removing the gate and data shorting bars.

23. The method according to claim 20, wherein forming the array substrate comprises:
forming gate lines and data lines;
forming first connection patterns connecting the gate lines and the gate probe test lines; and
forming second connection patterns connecting the data lines and the data probe test lines.

24. The method according to claim 23, wherein forming the array substrate further comprises forming a first pattern under and between adjacent first connection patterns and a second pattern under and between adjacent second connection patterns.

25. The method according to claim 23, wherein forming the array substrate further comprises forming an insulating layer between the gate probe test lines and the first connection patterns and between the data probe test lines and the second connection patterns, wherein the insulating layer includes a first hole between adjacent first connection patterns and a second hole between adjacent second connection patterns.

* * * * *